United States Patent [19]

Baitinger et al.

[11] 4,154,878

[45] May 15, 1979

[54] NO-DRY PROCESS OF APPLYING PHOSPHONIUM SALT PRECONDENSATES TO TEXTILES

[75] Inventors: William F. Baitinger, Raleigh; McDaniel L. Beard, Cary, both of N.C.

[73] Assignee: Cotton Incorporated, New York, N.Y.

[21] Appl. No.: 836,088

[22] Filed: Sep. 23, 1977

[51] Int. Cl.$^2$ .......................... C09K 3/28; C09D 5/18; D06M 13/44
[52] U.S. Cl. .................................... 427/341; 427/342; 427/353; 427/354; 427/359; 427/365; 427/390 D; 428/921
[58] Field of Search .................. 427/341, 342, 390 D, 427/353, 354, 359, 365; 428/921; 8/116 P, 195

[56] References Cited

U.S. PATENT DOCUMENTS

| | | | |
|---|---|---|---|
| 2,983,623 | 5/1961 | Coates | 427/342 |
| 3,310,420 | 3/1967 | Wagner | 427/342 |
| 3,784,356 | 1/1974 | Wagner | 427/390 D |
| 3,903,336 | 9/1975 | Nachbur et al. | 427/390 D |
| 4,026,711 | 5/1977 | Wayker et al. | 427/390 D |
| 4,078,101 | 3/1978 | Cole | 427/342 |

Primary Examiner—John D. Smith
Attorney, Agent, or Firm—Burns, Doane, Swecker & Mathis

[57] ABSTRACT

An improved, safe and economical process for impregnating a cellulose fabric with a flame retardant compound comprises: (a) impregnating the fabric with an aqueous solution of a phosphonium salt precondensate and a buffer; (b) adjusting the wet pick-up of the fabric and the concentration of the phosphonium salt precondensate in the pad bath such that the impregnated fabric has a phosphorus content of from about 3% to about 4% and a moisture content of from about 10% to about 20% both based on the weight of the fabric; and (c) without the necessity of drying the impregnated fabric, exposing it to ammonia in an amount and for a period of time sufficient to cure the compound. The impregnated fabric may then be subjected to conventional oxidation and process washing steps to yield the finished fabric.

15 Claims, No Drawings

NO-DRY PROCESS OF APPLYING PHOSPHONIUM SALT PRECONDENSATES TO TEXTILES

BACKGROUND OF THE INVENTION

1. Field of the Invention

This invention relates to a novel process for preparing a flame retardant fabric. More specifically, this invention relates to a process for impregnating by any appropriate means a fabric with a pad bath containing a buffered phosphonium salt precondensate and transferring the fabric directly to an ammoniation step without requiring an intermediate drying step.

2. Summary of the Prior Art

It is an established practice in the art to impregnate a fabric with a chemical to render the fabric flame resistant. Although numerous chemicals have been employed in this capacity, the vast majority of the chemicals contain phosphorus and nitrogen in one form or another. Typical of the phosphorus chemicals are neutralized phosphonium salts. The phosphonium salts are partially neutralized with an alkaline substance such as sodium hydroxide in the preparation of a pad bath. The fabric is passed through the bath and partially dried to a moisture content of between 5% and 20% based on the weight of the fabric. Although heat curing may be employed, the partially dried fabric is preferably exposed to gaseous ammonia or ammonium hydroxide to polymerize or cross-link the phosphorus chemical, thereby "fixing" the same in the fabric. Oxidation and process washing typically follow to yield the final fabric. For example, U.S. Pat. No. 2,772,188 discloses a process for impregnating a cellulosic textile with a flame retardant chemical by passing the textile through an aqueous pad bath containing a mixture of tetrakis-(hydroxymethyl)phosphonium chloride, tris (hydroxymethyl) phosphonium oxide and a water soluble methylolmelamine. The impregnated textile is dried at an elevated temperature and then treated with gaseous ammonia, ammonium hydroxide or a solution of ammonia in an inert solvent. Similarly, U.S. Pat. No. 2,911,322 describes air-drying prior to ammoniation.

It has been found that processes such as those of U.S. Pat. Nos. 2,772,188 and 2,911,322 suffer from a major disadvantage in that there is a tendency of the phosphonium salt condensate to migrate to the surface of the cellulosic textile on treatment with the ammonia containing solution. This creates a potential danger in that the increased concentration of the flame retardant compound on the surface of the textile may result in the fire retardant polymer being improperly formed, such as by making short chain polymers that may be easily removed in subsequent washing. Also high surface concentrations of chemicals can result in fabric stiffening. In an attempt to alleviate this problem, it has been proposed to partially "fix" the phosphonium salt in the textile or fabric prior to the ammoniation step. As disclosed in U.S. Pat. No. 3,236,676 this process involves raising the pH of the pad bath to a value in the preferred range of from 5.5 to 7.0 and heating the impregnated textile at a temperature of between 100° and 180° C. prior to the ammoniation step. To raise the pH value of the bath, an alkali metal hydroxide is added thereto. While this process is effective in obtaining a textile which is evenly impregnated with the flame retardant compound, the addition of the alkali metal hydroxide to the pad bath creates additional disadvantages. Specifically, if the alkali metal hydroxide is added to the bath in the form of an aqueous solution, the bath is diluted to the extent that a post-padding drying step is required. On the other hand, if the alkali metal hydroxide is added in flake form, the highly exothermic nature of the neutralization reaction causes localized heating effects which may decompose the phosphonium salts.

An alternative method of obviating the aforementioned migration problem is set forth in U.S. Pat. No. 2,983,623. As described therein, cellulosic material is made flame retardant by passing it through a pad bath, partially drying it, exposing the partially dried material to gaseous ammonia and then treating the material with an aqueous solution of ammonia. The pad bath is comprised of an aqueous solution of a phosphonium salt, such as tetrakis-(hydroxymethyl)phosphonium chloride (THPC), which has been chemically reacted with urea to form a "precondensate". In order to reduce acid degradation of the material, buffering agents, such as sodium acetate, are added to the bath in an amount sufficient to raise the bath pH to above 3.5. Exposing the dried material to gaseous ammonia ensures that the flame retardant compound becomes fixed and remains within the material, while the treatment with the aqueous solution of ammonia quickly completes the polymerization of the fixed phosphonium compound.

Another known method of rendering a cellulosic fabric flame retardant involves the wet-curing of a fabric impregnated with a melamine derivative and a phosphoric amide. As described in U.S. Pat. No. 3,632,297, the melamine derivative comprises melamine and formaldehyde or melamine, formaldehyde and an alkanol. The melamine derivative and the phosphoric amide typically are impregnated into the fabric by passing the fabric through a pad bath. The concentration of the individual coreactants in the bath and the wet pick-up are adjusted to give the desired add-ons of phosphorus and nitrogen. One manner of adjusting the wet pick-up of the fabric is disclosed as the regulation of the pressure of the squeeze rolls, which contact the fabric after it has passed through the pad bath. (See U.S. Pat. No. 3,310,419 for alternative methods of adjusting the wet pick-up of the fabric). After the padded fabric has dried to a moisture content of about 10%, either by air drying or a forced-draft oven, the fabric is maintained at a moisture content of that level and a temperature of about 20° to 110° C., preferably by contacting the fabric with saturated steam.

In each of the above described processes for preparing a flame retardant fabric, an integral step comprises the drying of the fabric after it has been impregnated with the flame retardant chemical. The drying step, particularly if accomplished by a forced-draft oven, may produce unwanted odors in that discrete amounts of the flame retardant chemical or other components of the treating bath are carried into the atmosphere by the evaporation of the bath solvent, e.g. water. Moreover, the drying apparatus adds considerably to the complexity of the overall process and thus makes the process more costly.

Accordingly, the search has continued for an improved process of impregnating a fabric with a fire retardant chemical which eliminates the need for a drying step prior to ammoniation. The present invention was developed as a result of this search.

OBJECTS AND SUMMARY OF THE INVENTION

It is therefore a general object of the present invention to obviate or substantially alleviate the problems of the prior art.

A more specific object of the present invention is to provide a safe, economical process of preparing a flame retardant cellulosic fabric.

It is another object of the present invention to provide a process of preparing a flame retardant cellulosic fabric which eliminates the need for a drying step prior to ammoniation.

It is a further object of the present invention to eliminate the need for a drying step prior to ammoniation in a process for rendering a cellulosic fabric flame retardant by adjusting the concentration of a phosphonium salt precondensate, buffer and water, and controlling the wet pick-up of the fabric.

Other objects and advantages of the present invention will become apparent from the following summary and description of the preferred embodiments of the present invention.

In one aspect, the present invention provides a novel process for impregnating a cotton or similar cellulose fiber containing fabric with a durable flame retardant compound. This process comprises:

(a) impregnating the fabric with an aqueous solution of a phosphonium salt precondensate and a buffer;

(b) adjusting the wet pick-up of the fabric and the concentration of the phosphonium salt precondensate in said solution such that the impregnated fabric has a phosphorus content of from about 3% to about 4% and a moisture content of from about 10% to about 20% both based on the weight of the fabric; and (c) in the absence of a drying step, exposing the impregnated fabric to ammonia gas in an amount and for a time sufficient substantially to cure the compound.

In another aspect, the present invention pertains to a process for impregnating a cellulose fiber containing fabric with a durable flame retardant compound which comprises:

(a) impregnating the fabric with an aqueous solution of a precondensate from tetrakis-(hydroxymethyl)phosphonium sulfate and urea, and sodium acetate, said solution having a pH of from about 3 to about 6;

(b) adjusting the wet pick-up of the fabric and the concentration of the precondensate such that the impregnated fabric has a phosphorus content of from about 3% to about 4% and a moisture content of from about 10% to about 20% both based on the weight of the fabric;

(c) allowing a dwell time sufficient to ensure penetration of the solution throughout the fabric; and (d) in the absence of a drying step, exposing the impregnated fabric to ammonia gas in an amount and for a period of time sufficient to cure the compound.

DESCRIPTION OF PREFERRED EMBODIMENT

As indicated above, the present invention relates to a process of impregnating a cellulose fabric with a flame retardant compound. As used herein, the term "cellulose fabric" includes bulk fibers or yarns and woven or non-woven fabrics which are composed of natural or reconstituted cellulose fibers, e.g. cotton, linen or viscose rayon or blends containing at least 50% of cellulose fibers with the balance being other fibers such as polyester, polyamide, wool or the like. Fabrics having a cotton content of at least 80% are particularly preferred.

The cellulose fabric which is to be treated in accordance with the present invention initially is impregnated with an aqueous solution of a phosphonium salt precondensate and a buffer. The phosphonium salt precondensate may be prepared by reacting a phosphonium salt with urea or other nitrogen containing compounds, such as dicyandiamide or various amines, which will form condensates with the phosphonium salts. The precise manner in which the precondensate is prepared is known in the art and need not be described here. See, for example, U.S. Pat No. 2,983,623, the content of which is incorporated here by reference for purposes of brevity and clarity. The precondensate that is employed in the present invention may be a preformed chemical solution or may be formed in situ by dissolving predetermined amounts of the phosphonium salt, the nitrogen containing compound and the buffer in the pad bath.

Any phosphonium salt that will form a precondensate with urea or other suitable nitrogen containing compounds and is curable by means of ammonia may be used in the present invention. Typical of the phosphonium salts are tetrakis-(hydroxymethyl)phosphonium sulfate (THPS), tetrakis-(hydroxymethyl)phosphonium chloride (THPC), tetrakis-(hydroxymethyl) phosphonium phosphate (THPP) or mixtures thereof, the preferred salt being THPS. Typically, the precondensates are formed by reacting about 2 to 4 moles of such a phosphonium salt per mole of urea.

An aqueous solution of the phosphonium salt precondensate may be highly acidic. If this solution were employed to impregnate the cellulose fabric, it could seriously degrade the structural integrity of the fabric. To overcome this problem, a buffer is added in an amount sufficient to raise the pH of the aqueous solution to between about 3 and about 6, preferably between about 4.5 and 5.5. Typical buffers are sodium acetate, triethanolamine, ammonium acetate and ammonium salts of weak acids. Although any suitable buffer may be used in the present invention, the preferred buffer is sodium acetate, in either anhydrous or hydrated form.

In addition to the phosphonium salt precondensate and the buffer, other optional additives conventionally used in the art may be incorporated in the aqueous solution. For example, the aqueous solution may contain from about 0.05% to about 0.25% of a surfactant. It has been found that with respect to certain surfactants, a longer dwell time is required prior to ammoniation to render the fabric properly flame retardant. Other conventional additives, such as softeners, which do not adversely affect the phosphonium salt precondensate may also be included in the aqueous solution as required. Optimum dwell times can be readily determined for each case by preliminary empirical tests and may range, for instance, from about 5 minutes to 40 hours.

As described above, the cotton or other cellulose fabric is impregnated with the aqueous solution of the phosphonium salt precondensate and the buffer. To obtain the fullest degree of saturation of the fabric with the aqueous solution, it is preferred to pass the fabric through a pad bath of the solution. The pad bath is maintained at a temperature of from about 21° to about 38° C. Following padding, the fabric is squeezed to reduce the solution content to the desired level in the fabric. If a high bath concentration is employed, as in the subsequent examples, it may not be feasible to squeeze the fabric sufficiently to remove solution to the desired pick-up level. In such instances, alternative means of application of the pad bath solution must be employed, such as use of an engraved roll or kiss roll.

It is to be understood that the fabric may also be impregnated with the solution by other conventional techniques. For example, the cellulose fabric may be passed between two opposed nozzles which spray the solution onto the fabric. Alternatively, the fabric may be passed between a series of transfer applicator rollers. Other methods which are apparent to those skilled in the art may similarly be employed to impregnate the cellulosic fabric with the aqueous solution such that the proper, predetermined moisture and phosphorus contents are obtained in the fabric.

The concentration of the phosphonium salt precondensate in the aqueous solution and the wet pick-up of the cellulose fabric comprise the essence of the present invention. To eliminate a drying step prior to ammoniation, the impregnated cellulose fabric should have a moisture content of between about 10% and about 20%, preferably from about 13% to about 18% based on the dry weight of the fabric.

It must be stressed that the moisture content of the cellulose fabric is critical to the success of the present invention. Because of its high affinity for ammonia, water acts as a solvent for ammonia and for the reaction of the phosphonium salt precondensate and the ammonia. If the moisture content of the fabric is too low, an insufficient amount of ammonia is absorbed by the fabric. This results in improper fixing of the phosphorus compound. On the other hand, if the moisture content of the fabric is too high, the phosphorus polymer, which is formed from the reaction of the phosphonium salt precondensate and the ammonia, has a relatively low molecular weight and thus possesses poor fire retardant durability.

To impart fire retardancy to the cellulose fabric, the fabric must possess a phosphorus content of from about 2% to about 5%, preferably from about 3% to about 4% based on the dry weight of the fabric.

It will be apparent to those skilled in the art that the three variables, namely the concentration of phosphorus in the aqueous solution, the concentration of water in the aqueous solution and the solution pick-up of the fabric, cannot be varied independently of each other. For example, considering the phosphorus compound and water as a two-component system, since the phosphorus compound concentration may be determined by subtracting the percentage of water from 100%, if the concentration of water is decreased in the aqueous solution, the phosphorus concentration must increase correspondingly. By analogy, if the wet pick-up of the fabric is decreased, both the water content and the phosphorus content of the fabric will be decreased.

The formulas employed to calculate the amount of phosphorus deposited on the fabric and the moisture content of the fabric at 100% wet pick-up, are as follows:

% P deposited on fabric (dry basis) =
$$\frac{\text{wt. of chemical in solution} \times \text{\% P in chemical}}{\text{wt. of dry fabric}}$$

For instance, $$\text{\% P on fabric} = \frac{30 \times 10}{100} = 3.0(\%)$$

$$\text{\% moisture in fabric (wet basis)} = \frac{\text{wt. H}_2\text{O absorbed}}{\text{wt. of moist fabric}}; \text{e.g., } \frac{70}{200} = 35(\%)$$

The amount of solution absorbed by the fabric is determined by multiplying the weight of the fabric by the wet pick-up of the fabric. Thus, a 100 gram sample of fabric having a wet pick-up of 100% will absorb 100 grams of solution, and if the solution contains 30% of the phosphorus chemical and the latter contains 10% phosphorus, 3% phosphorus will be deposited on the fabric. To illustrate the interrelationship of the three variables, the following example is used: An aqueous pad bath containing 30% of a phosphorus chemical (the chemical containing 10% phosphorus) is applied to a 100 gram sample of fabric at a wet pick-up of 100%. Under these conditions, 3% phosphorus will be deposited on the fabric. The moisture content of the fabric immediately following application in this instance will be 35%, which is excessive to be useful in this invention. Alternatively, 3% phosphorus may be deposited on the sample of fabric from a bath containing 60% of the same phosphorus chemical, if the wet pick-up is 50%. In this latter instance, the moisture content of the fabric, following application, will be 13%, a significant reduction from the previous value.

Thus, to obtain an impregnated cellulose fabric that does not require a drying step prior to ammoniation, it is necessary to select carefully the concentration of both the phosphonium salt precondensate and the water in the aqueous solution and the wet pick-up of the fabric such that the impregnated fabric has a phosphorus and moisture content within the required ranges.

Subsequent to the impregnation of the cellulose fabric with the aqueous solution in the previously described fashion, the fabric is ready for the ammoniation step. However, to ensure that the final fabric is thoroughly flame retardant, the location of the chemical within the fibers of the fabric must be considered. It will be appreciated that the components of the aqueous solution must thoroughly penetrate all the fibers to render the same flame retardant. In general, after the cellulose fabric has been exposed to the aqueous solution and the proper wet pick-up has been obtained, some dwell time is employed to ensure thorough and even penetration of the flame retardant compound throughout the fabric, for durability and for adequate performance of the flame retardancy treatment. The dwell time required for a particular fabric depends on a number of factors including the concentration of the components in the aqueous solution, the method of adjusting the wet pick-up, and the fabric construction. Suitable dwell times encompass a wide range and may vary from one minute or less to forty hours or more. Satisfactory and optimum dwell times for any given case can in any event be readily determined by preliminary empirical testing. Moisture should be maintained at not less than about 10% during the dwell time.

It is to be emphasized that the dwell time of the present invention does not correspond to the air drying discussed in conjunction with the known processes of rendering a fabric flame retardant. As used herein, the term "dwell time" refers to that interval of time wherein adequate penetration of the aqueous solution components into the fibers is obtained without a substantial reduction in the fabric moisture content, i.e., while maintaining the moisture content between 10% and 20%. To ensure that the moisture content of the fabric remains substantially constant, the impregnated fabric may be wrapped in sheets of a water impervious material such as polyethylene. In contradistinction from the present invention, conventional air drying involves a substantial reduction in the moisture content of the impregnated fabric, i.e. from above 20% to between 10% and 20%. Such drying tends to cause an undesirable migration of the flame retardant chemicals within the fabric as the moisture evaporates, and leads to an uneven distribution of the protective chemicals within the fabric upon completion of the treatment.

After sufficient dwell time has been allowed to ensure proper, substantially uniform penetration of the aqueous solution, the cellulosic fabric is ammoniated by any means adequate to assure proper access of ammonia gas to the impregnated fabric and to provide time for the insoluble polymer of adequate molecular weight to form. Typical of such means is a chamber containing the ammonia gas at a temperature of from about 20° to about 60° C. and at atmospheric pressure. The ammonia that is present in the chamber may originate from a pressurized tank, or from other means suitable for delivering gaseous ammonia to the reactor.

To obtain the finished product, the ammoniated and cured cellulosic fabric is subjected to conventional oxidation and process washing steps which are otherwise well known in the art. See, for example, U.S. Pat. No. 3,236,676, the content of which is incorporated here by reference for purposes of brevity and clarity. As explained in that patent, these steps typically involve washing the ammoniated fabric in a first aqueous bath containing soap and hydrogen peroxide and a second bath of hot water. The fabric is then dried.

The following examples are given as specific illustrations of the process. It should be understood, however, that the invention is not limited to the specific details set forth in the examples. It should also be understood that unless otherwise indicated, percentages or proportions of materials are stated on a weight basis throughout this specification and the appended claims.

EXAMPLE 1

An aqueous pad bath containing 85% tetrakis (hydroxymethyl) phosphonium sulfate and 0.5% Tergitol TMN-6 surfactant trimethyl nonanol ethoxylate sold by Union Carbide Corp.) is applied to 100% cotton twill fabric weighing 8 oz./yd.$^2$ The bath is applied to the fabric by two passes through an engraved roll applicator to give 21% wet pick-up, to supply the amount of phosphorus (2.8%P) to the fabric calculated to be necessary for adequate flame retardant treatment. The fabric is promptly ammoniated without drying. After ammoniation, the fabric is oxidized with hydrogen peroxide, washed, and dried. The twill fabric fails the children's sleepwear flammability standard (FF 3-71). This example shows that an acid phosphonium salt, applied unneutralized or unbuffered, and ammoniated directly without intermediate drying, cannot be used to impart acceptable fire retardancy to the fabric.

EXAMPLE 2

An aqueous pad bath containing 75% of a commercial precondensate of tetrakis (hydroxymethyl) phosphonium sulfate and urea ("Fireaway 3S" brand, containing 9.55% phosphorus, made by Valchem Co.), 5.0% sodium acetate (trihydrate) and 0.2% Tergitol TMN-6 surfactant is applied to an 8 oz./yd.$^2$, 100% cotton sateen. The fabric is padded six times through the engraved roll applicator used above to obtain a wet pick-up of 50%. 3.6% phosphorus is deposited on the fabric. The moisture content of the padded fabric is 15%. The fabric is then rolled and kept wrapped in polyethylene for various intervals. More specifically, portions of the fabric are removed and ammoniated at half-hour intervals. After ammoniation, the treated fabrics are oxidized with hydrogen peroxide, washed, dried and tested for flame retardancy.

| Dwell Time (min.) | Char Length (50 HLTD, in.) |
|---|---|
| 30 | 1.2 |
| 60 | 1.0 |
| 90 | 0.7 |
| 120 | 0.7 |
| 150 | 1.4 |
| 180 | 0.7 |

The treated fabrics pass the children's sleepwear flammability standard after dwell intervals of 30 minutes (the minimum dwell time employed) through 180 minutes (maximum dwell time). This illustrates acceptable fire retardancy achieved by use of phosphonium salt "precondensates."

EXAMPLE 3

The pad bath used in Example 2 is applied to an 8 oz./yd.$^2$ sateen by conventional padding techniques (dip and single squeeze). Wet pick-up is 58%. The fabric contains 4.1% phosphorus and 17.5% moisture. The padded fabric is ammoniated within five minutes of impregnation without intermediate drying. The fabric passes the children's sleepwear flammability standard. This example illustrates that padding may also be employed to apply the finish, provided the proper level of phosphorus and moisture is attained. It further shows that when the finish is squeezed or otherwise forced into the cotton fibers ammoniation may follow almost immediately thereafter.

EXAMPLE 4

An aqueous pad bath containing 70% of a precondensate of THPS and urea ("Fireaway 3 S", 9.55% P), 2.8% sodium acetate (anhydrous) and 0.2% Triton X-100 surfactant (a non-ionic surfactant sold by Rohm and Haas Company) is applied to an 8 oz./yd.$^2$ cotton twill fabric using a kiss-roll applicator. One pass through the kiss-roll applicator yields a wet pick-up of 56%, deposits 3.9% phosphorus onto the fabric, and gives a moisture content of 19%. The fabric is rolled in a polyethylene sheet after application, covered to avoid loss of moisture, and allowed to stand for 20 hours. Following the 20-hour period, the fabric is ammoniated, oxidized with hydrogen peroxide, washed, and dried. This fabric fails FF 3-71. This example illustrates that when the concentrated precondensate is merely applied to the surface of the fabric with a kiss-roll applicator, 20 hours dwell prior to ammoniation is not sufficient in this case to permit penetration of the finish into the cotton fibers to pass the flammability requirements.

EXAMPLE 5

An aqueous pad bath containing 75% of a precondensate of THPS and urea ("Fireaway 3 S", 9.55% P) and 3.0% sodium acetate (anhydrous) is applied to a 100% cotton, 8 oz./yd.$^2$, two-ply, combed sateen. The fabric is passed through a kiss roll applicator, and a wet pick-up of 48% is obtained. The 48% wet pick-up applies 3.4% phosphorus and 15% moisture to the fabric. The fabric is rolled and covered. Forty (40) hours later, the fabric is ammoniated, oxidized with hydrogen peroxide, washed and dried. The finished fabric passes the children's sleepwear standard FF 3-71.

EXAMPLE 6

The same cotton sateen fabric as in Example 5 is treated in the same manner as in Example 5. The fabric is rolled after application and covered for 20 hours. The fabric is then ammoniated, oxidized, washed and dried as in Example 5. Under these conditions the fabric fails the children's sleepwear standard (FF 3-71). A comparison between the results of Examples 5 and 6 illustrates the need for adequate dwell time for this particular bath concentration, method of application, wet pick-up and fabric to achieve acceptable fire retardancy.

EXAMPLE 7

An aqueous pad bath containing 94% of a precondensate of THPS and urea, 0.2% ("Fireaway 3 S", 9.55% P) Tergitol TMN-6 surfactant, and 5.8% sodium acetate (trihydrate) is applied with an engraved roll applicator to an 8 oz./yd.$^2$ 100% cotton sateen. At 39% wet pick-up 3.5% phosphorus is deposited on the fabric and the fabric contains 8% moisture. Samples of fabric are ammoniated immediately, after 15–20 minutes and after 30–35 minutes dwell time, respectively, during which time the fabric is maintained in a rolled and covered configuration. Following ammoniation the fabric is oxidized with hydrogen peroxide, washed, and dried. Subsequent testing shows the fabrics to fail FF 3-71. This example illustrates that at 8% moisture 30–35 minutes dwell time is too short to achieve the desired flammability results. However, as shown in Example 8, satisfactory results are readily obtained with this system when higher moisture content is provided.

EXAMPLE 8

A pad bath containing about 75% of a precondensate of THPS and urea ("Fireaway 3 S", 9.55% P), 5.0% sodium acetate (trihydrate) and 0.2% Tergitol TMN-6 surfactant is applied using an engraved roll applicator to an 8 oz./yd.$^2$ 100% cotton sateen. The application gives 2.9% phosphorus and 14% moisture on the fabric. The fabric is ammoniated immediately, after 15–20 minutes dwell time and after 30–35 minutes dwell time in a rolled configuration. Following ammoniation, the fabric is oxidized with hydrogen perioxide, washed, and dried. Samples of fabric ammoniated immediately after application of the pad bath failed the FF 3-71 test. However, the fabric samples ammoniated after 15–20 minutes and after 30–35 minutes dwell time pass FF 3-71. A comparison between this and Example 7 illustrates that at 14% moisture content less dwell time is required than at 8% moisture to produce satisfactory flame retardancy.

EXAMPLE 9

The pad bath in Example 8, but without including the surfactant, is applied to the described sateen fabric, using an engraved roll applicator, 3.0% phosphorus is deposited on the fabric and a 14% moisture content thereby results. Samples of fabric are ammoniated immediately after application, after 15–20 minutes dwell time, and after 30–35 minutes dwell time. Following ammoniation, the fabrics are oxidized with hydrogen peroxide, washed, and dried. All samples pass FF 3-71. This example illustrates that elimination of the surfactant from the pad bath formulation surprisingly results in a more rapid penetration of the flame retardant chemicals throughout the fabric.

As may be seen from the above description and specific examples, a cellulose fabric that is treated in accordance with the present invention displays excellent fire retardant properties. These properties are durable in that they remain over a number of wash cycles. Moreover, the treated fabric is not structurally degraded and possesses good surface characteristics, e.g. hand.

Although the invention has been described with preferred embodiments, it is to be understood that variations and modifications may be resorted to as will be apparent to those skilled in the art. For example, the present invention may be carried out as a continuous process, a semi-continuous, or batch process. These variations and modifications are to be considered within the scope of the following claims.

We claim:

1. A process for imparting durable flame retardance to a cellulose fabric by the use of a flame retardant compound comprising:
    (a) impregnating the fabric with an aqueous solution of an ammonia curable phosphonium salt precondensate and a buffer;
    (b) adjusting the wet pick-up of the fabric and the concentration of the phosphonium salt precondensate in said solution such that the solution penetrates throughout the fabric and the impregnated fabric has a phosphorus content of from about 2% to about 5% and a moisture content of from about 10% to about 20% both based on the weight of the fabric; and
    (c) in the absence of a drying step, exposing the impregnated fabric to ammonia gas in an amount and for a period of time sufficient to cure the precondensate.

2. The process of claim 1, wherein said phosphonium salt precondensate comprises a phosphonium salt and urea.

3. The process of claim 2, wherein said phosphonium salt is tetrakis-(hydroxymethyl)phosphonium sulfate.

4. The process of claim 1, wherein said buffer is selected from the group consisting of sodium acetate, triethanolamine and ammonium acetate.

5. The process of claim 3, wherein said buffer is sodium acetate.

6. The process of claim 1, wherein said solution has a pH of from about 3 to about 6.

7. The process of claim 1, wherein the wet pick-up of the fabric is adjusted by passing the fabric through an engraved roll applicator to produce a moisture content within the stated range.

8. The process of claim 1, wherein the fabric is impregnated with said aqueous solution by passing the fabric through a pad bath.

9. The process of claim 1, wherein the fabric after impregnation is maintained under substantially nondrying conditions for a dwell time of from about 5 min. to about 40 hrs. and sufficient to ensure penetration of the solution throughout the fabric.

10. The process of claim 1, wherein the ammoniated fabric is subjected to a finishing operation comprising oxidation and process washing.

11. The process of claim 1, wherein said aqueous solution includes a surfactant and a fabric softener.

12. The process of claim 1, wherein said aqueous solution excludes a surfactant.

13. A process for imparting durable flame retardance to a cotton containing fabric comprising:
(a) impregnating the fabric with an aqueous solution of a precondensate of urea and a phosphonium salt selected from the group consisting of tetrakis-(hydroxymethyl)phosphonium chloride and tetrakis-(hydroxymethyl)phosphonium sulfate, and sodium acetate as a buffer, said solution having a pH of from about 3 to about 6,
(b) adjusting the wet pick-up of the fabric and the concentration of the precondensate in the solution, such that the impregnated fabric has a phosphorus content of from about 2% to about 5% and a moisture content of from about 10% to about 20% both based on the weight of the fabric,
(c) allowing a dwell time sufficient to ensure effective penetration of the solution throughout the fabric, and
(d) in the absence of a drying step, exposing the impregnated fabric to ammonia gas in an amount and for a period of time to cure and substantially insolubilize the phosphorus containing chemical in the fabric.

14. the process of claim 13, wherein the impregnated fabric has a phosphorus content of from about 3% to about 4%.

15. The process of claim 2 wherein said phosphonium salt is tetrakis-(hydroxymethyl)phosphonium chloride.

* * * * *